(12) United States Patent
Kim et al.

(10) Patent No.: US 10,384,200 B2
(45) Date of Patent: Aug. 20, 2019

(54) SUPPORTED CATALYST, METHOD FOR PREPARING SAME, SECONDARY STRUCTURE OF CARBON NANOSTRUCTURE MANUFACTURED USING SAME

(71) Applicant: LG CHEM, LTD., Seoul (KR)

(72) Inventors: SungJin Kim, Daejeon (KR); Dongchul Lee, Daejeon (KR); KyungYeon Kang, Daejeon (KR); Seungyong Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/422,613

(22) PCT Filed: Jul. 15, 2014

(86) PCT No.: PCT/KR2014/006302
§ 371 (c)(1),
(2) Date: Feb. 19, 2015

(87) PCT Pub. No.: WO2015/008988
PCT Pub. Date: Jan. 22, 2015

(65) Prior Publication Data
US 2015/0238950 A1    Aug. 27, 2015

(30) Foreign Application Priority Data

Jul. 19, 2013  (KR) .................. 10-2013-0085558
Jul. 14, 2014  (KR) .................. 10-2014-0088423

(51) Int. Cl.
*B01J 35/00*   (2006.01)
*B01J 21/04*   (2006.01)
(Continued)

(52) U.S. Cl.
CPC .......... *B01J 35/0006* (2013.01); *B01J 21/04* (2013.01); *B01J 23/002* (2013.01); *B01J 23/22* (2013.01);
(Continued)

(58) Field of Classification Search
None
See application file for complete search history.

(56) References Cited

U.S. PATENT DOCUMENTS

2006/0039849 A1* 2/2006 Resasco ................ B01J 8/0055
423/447.3
2011/0212016 A1* 9/2011 Lee ......................... B01J 23/74
423/447.3
(Continued)

FOREIGN PATENT DOCUMENTS

CN     102648046 A    8/2012
JP     2005-272261 A  10/2005
(Continued)

OTHER PUBLICATIONS

Lee et al., "A core-shell structured, metal-ceramic composite-supported Ru catalyst for methane steam reforming", Journal of Power Sources, 216, pp. 256-260, 2012.*
(Continued)

*Primary Examiner* — Scott R. Walshon
*Assistant Examiner* — Elaine M Vazquez
(74) *Attorney, Agent, or Firm* — Dentons US LLP (57) ABSTRACT

The present invention relates to a supported catalyst having a structure in which a metal catalyst is supported on a core-shell structured support. The support includes core particles and shell particles having a smaller particle diameter than the core particles and coated on the core particles to form a shell layer. Due to this structure, the supported catalyst can be used to produce carbon nanostructures that
(Continued)

form a novel secondary structure in which ends of the carbon nanostructures are supported on the supported catalyst and form independent branches and the opposite ends grow and are assembled together. The novel structure is expected to find application in various fields, such as energy materials, functional composites, pharmaceuticals, batteries, and semiconductors, because of its characteristic shape.

18 Claims, 9 Drawing Sheets

(51) Int. Cl.

| | | |
|---|---|---|
| B01J 23/22 | (2006.01) | |
| B01J 23/28 | (2006.01) | |
| B01J 23/745 | (2006.01) | |
| B01J 23/75 | (2006.01) | |
| B01J 23/882 | (2006.01) | |
| B01J 37/18 | (2006.01) | |
| B01J 37/00 | (2006.01) | |
| B01J 37/02 | (2006.01) | |
| B01J 23/00 | (2006.01) | |
| C01B 32/162 | (2017.01) | |
| B01J 23/847 | (2006.01) | |
| B01J 35/02 | (2006.01) | |
| B01J 23/88 | (2006.01) | |

(52) U.S. Cl.
CPC .............. *B01J 23/28* (2013.01); *B01J 23/745* (2013.01); *B01J 23/75* (2013.01); *B01J 23/882* (2013.01); *B01J 35/008* (2013.01); *B01J 37/0018* (2013.01); *B01J 37/0203* (2013.01); *B01J 37/0205* (2013.01); *B01J 37/0207* (2013.01); *B01J 37/0211* (2013.01); *B01J 37/18* (2013.01); *C01B 32/162* (2017.08); *B01J 23/8472* (2013.01); *B01J 23/88* (2013.01); *B01J 35/023* (2013.01); *B01J 37/0221* (2013.01); *C01B 2202/34* (2013.01); *C01B 2202/36* (2013.01); *Y10T 428/2991* (2015.01)

(56) References Cited

U.S. PATENT DOCUMENTS

| | | | |
|---|---|---|---|
| 2012/0135858 A1 | 5/2012 | Silvy et al. | |
| 2012/0149551 A1 | 6/2012 | Gaillard et al. | |
| 2014/0072505 A1* | 3/2014 | Fonseca | B82Y 30/00 423/447.2 |
| 2014/0323785 A1 | 10/2014 | Lande et al. | |

FOREIGN PATENT DOCUMENTS

| | | |
|---|---|---|
| JP | 2006-026532 A | 2/2006 |
| JP | 2007-261867 A | 10/2007 |
| KR | 10-2010-0045247 | 5/2010 |
| KR | 10-2010-0077422 | 7/2010 |
| KR | 10-2012-0090108 | 8/2012 |
| KR | 10-2013-0072131 | 7/2013 |
| KR | 10-2013-0078855 | 7/2013 |
| WO | 2013-105112 A1 | 7/2013 |

OTHER PUBLICATIONS

Ciambelli, "Effects of alumina phases and process parameters on the multiwalled carbon nanotubes growth", Diamond & Related Materials 16, 1144-1149, 2007.*
JP 2005-272261 English Machine Translation.*
Wu et al., "Synthesis of y-AlOOH (y-Al2O3) self-encapsulated and hollow architectures", Materials Chemistry and Physics 109 (2008) 560-564.*
Aerosil—Fumed Silica: Technical Overview, available at http://www.aerosil.com/product/aerosil/downloads/technical-overview-aerosil-fumed-silica-en.pdf (Year: 2015).*
Sigma-Aldrich, Particle Size Conversion Table, available at https://www.sigmaaldrich.com/chemistry/stockroom-reagents/learning-center/technical-library/particle-size-conversion.html (Year: 2018).*
"Boehmite Nanoparticles" SkySpring Nanomaterials, Inc., available at http://ssnano.com:80/inc/sdetail/boehmite_nanoparticles/192 accessed through Wayback Machine, Feb. 12, 2013 (Year: 2013).*
"Continuous Multilayered Carbon Nanotube Yarns" Zhong, et al.; Adv. Mater. 2010, 22, 692-696.
"Strong Carbon-Nanotube Fibers Spun from Long Carbon-Nanotube Arrays"; Zhang, et al.; small 2007, 3, No. 2, 244-248.
Fazle Kibria, A.K.M., et al., "Synthesis of carbon nanotubes over nickel-iron catalysts supported on alumina under controlled conditions," Catalysis Letters, vol. 71, No. 3-4, 2001, pp. 229-236.
Chai,Siang-Piao, et al., "The effect of catalyst calcination temperature on the diameter of carbon nanotubes synthesized by the decomposition of methane," Carbon, vol. 45, 2007, pp. 1535-1541.

* cited by examiner

No calcination

No calcination

SUPPORTED CATALYST, METHOD FOR PREPARING SAME, SECONDARY STRUCTURE OF CARBON NANOSTRUCTURE MANUFACTURED USING SAME

This application is a National Stage Entry of International Application No. PCT/KR2014/006302, filed Jul. 15, 2014, and claims the benefit of Korean Application No. 10-2013-0085558 filed on Jul. 19, 2013 and Korean Application No. 10-2014-0088423, filed Jul. 14, 2014, all of which are hereby incorporated by reference in their entirety for all purposes as if fully set forth herein.

BACKGROUND OF THE INVENTION

1. Field of the Invention

The present invention relates to a supported catalyst, a method for preparing the supported catalyst, and a secondary structure of carbon nanostructures produced using the supported catalyst.

2. Description of the Related Art

Carbon nanostructures (CNSs) refer collectively to nano-sized carbon structures having various shapes, such as nanotubes, nanohairs, fullerenes, nanocones, nanohorns, and nanorods. Carbon nanostructures can be widely utilized in a variety of technological applications because they possess excellent characteristics.

Carbon nanotubes (CNTs) are tubular materials consisting of carbon atoms arranged in a hexagonal pattern and have a diameter of approximately 1 to 100 nm. Carbon nanotubes exhibit insulating, conducting or semiconducting properties depending on their inherent chirality. Carbon nanotubes have a structure in which carbon atoms are strongly covalently bonded to each other. Due to this structure, carbon nanotubes have a tensile strength approximately 100 times that of steel, are highly flexible and elastic, and are chemically stable.

Carbon nanotubes are divided into three types: single-walled carbon nanotubes (SWCNTs) consisting of a single sheet and having a diameter of about 1 nm; double-walled carbon nanotubes (DWCNTs) consisting of two sheets and having a diameter of about 1.4 to about 3 nm; and multi-walled carbon nanotubes (MWCNTs) consisting of three or more sheets and having a diameter of about 5 to about 100 nm.

Carbon nanotubes are being investigated for their commercialization and application in various industrial fields, for example, aerospace, fuel cell, composite material, biotechnology, pharmaceutical, electrical/electronic, and semiconductor industries, due to their high chemical stability, flexibility and elasticity. However, carbon nanotubes have a limitation in directly controlling the diameter and length to industrially applicable dimensions for practical use owing to their primary structure. Accordingly, the industrial application and use of carbon nanotubes are limited despite their excellent physical properties.

Attempts have been made to further diversify the roles of carbon nanostructures, such as carbon nanotubes, as structural reinforcements and chemically functional structures. For example, a method has been used in which primary structures of carbon nanostructures are collectively formed on a flat plate and are physically grown through spinning [Zhang, X.; Li, Q.; Tu, Y.; Li, Y.; Coulter, J. Y.; Zheng, L.; Zhao, Y.; Jia, Q.; Peterson, D. E.; Zhu, Y. Small, 2007, 3, 244]. However, this method requires a secondary spinning process after growth on the flat plate, leading to very low productivity. A carbon nanotube yarn produced by the method has a plate-like grown multilayer structure [Adv. Mater. Vol. 22, 2010, pages 692-696 (Nov. 24, 2009)].

Once secondary structures formed using conventional carbon nanostructures are excellent in chemical stability, elasticity, and flexibility, they are expected to find a variety of applications. Research on various experimental conditions, such as catalysts, carbon source mixed gases, reaction temperatures, times, and additives, is needed to mass produce secondary structures of carbon nanostructures with various shapes in an efficient manner.

Particularly, methods for preparing catalysts can be broadly divided into impregnation, precipitation, and ion exchange methods. The impregnation methods can be classified into spray, evaporation drying, incipient wetness impregnation, and adsorption methods depending on how to contact active materials.

According to the precipitation method, a precipitant is added to an aqueous solution of an active component. The product of ion concentrations may be greater than the solubility product depending on what component is precipitated. In this case, precipitation nuclei are formed and grow to give a precipitate. Catalysts prepared by this method can be classified into supported catalysts and non-supported catalysts. The supported catalysts are prepared by various methods, for example, a co-precipitation method in which supported components are simultaneously precipitated from a solution, a method in which a precipitate of a catalytically active component is mixed with a support, and a method in which a support is dipped in a solution of a catalytic component and a precipitant solution is added thereto to precipitate the catalytic component. The non-supported catalysts are prepared in the form of precipitates such as hydroxides and carbonates by bringing an aqueous solution of a catalytically active component into contact with a precipitant solution. Two or more kinds of catalytically active components may be used. In this case, the catalytically active components may be precipitated simultaneously, and optionally, the precipitates may be mechanically mixed to prepare the catalysts.

According to the ion exchange method, active components in the form of cations are supported by ion exchange. The ion exchange method is typically used to support metal ions on zeolite, silica, or silica-alumina as a support. The ion exchange method is advantageous in that active materials are very uniformly distributed. The interaction of a precursor of the metal with the support is strong and the degree of ion exchange is determined by the support components and the pH of a solution. Generally, the ion exchange reaction proceeds in two consecutive stages, i.e. ion diffusion and ion exchange stages. Accordingly, when the pore size of the support is small, the overall ion exchange rate is determined by the diffusion rate. If the amount of ions exchanged in the aqueous solution is smaller than that of exchange sites present in the support, the ions are exchanged only on the outer portion of the support, making it impossible to obtain a uniform distribution. In this case, long-term dipping is thus required and the ion-exchanged materials should undergo washing, drying, and calcination. The washing is performed to remove impurities remaining in the support during ion exchange. In the course of the drying, the catalyst remains substantially unchanged because of a strong interaction between the metal precursor and the support. The metal is sintered very slowly during the calcination but the final catalyst is affected by the calcination conditions.

Catalysts are increasingly being investigated for their ability to increase the yield of carbon nanostructures, including carbon nanotubes, or to more efficiently control the structure of carbon nanostructures.

SUMMARY OF THE INVENTION

The present invention is therefore intended to provide a catalyst having a novel structure that enables the formation of a novel structure of carbon nanostructures, a method for preparing the catalyst, and a carbon nanostructure aggregate including a secondary structure of carbon nanostructures.

One aspect of the present invention provides a core-shell structured supported catalyst including a support and a metal catalyst supported on the support wherein the support includes core particles and shell particles having a smaller particle diameter than the core particles and coated on the core particles to form a shell layer.

In the present invention, the ratio of the diameter ($d_{50}$) of the core particles to the diameter ($d_{50}$) of the shell particles may be 1:0.0001-0.1.

In the present invention, the diameter ($d_{50}$) of the core particles may be from 1 to 100 μm.

In the present invention, the diameter ($d_{50}$) of the shell particles may be from 0.01 to 0.9 μm.

In the present invention, the core particles and the shell particles may be made of the same or different Al-based materials.

In the present invention, the core particles and the shell particles may be each independently made of at least one material selected from the group consisting of AlO(OH), $Al(OH)_3$, gamma-$Al_2O_3$, and alpha-$Al_2O_3$.

In the present invention, the core particles/shell particles may be AlO(OH)/gamma-$Al_2O_3$, AlO(OH)/AlO(OH), gamma-$Al_2O_3$/gamma-$Al_2O_3$, gamma-$Al_2O_3$/AlO(OH), or a combination thereof.

In the present invention, the support may include 1 to 50% by weight of the shell particles, based on the total weight of the support.

In the present invention, the metal catalyst may be selected from the group consisting of Co, Fe, Mo, V, and mixtures thereof.

In the present invention, the metal catalyst may include a main catalyst selected from Co, Fe, and mixtures thereof and an auxiliary catalyst selected from Mo, V, and mixtures thereof.

In the present invention, the metal catalyst may include the main catalyst and the auxiliary catalyst in a molar ratio of 20-1:1.

In the present invention, the metal catalyst may include 1 to 40% by weight of the main catalyst, based on the total weight of the supported catalyst.

In the present invention, the supported catalyst may be one for carbon nanostructure production.

In the present invention, the carbon nanostructures may be carbon nanotubes, carbon nanorods, carbon nanohairs, or carbon nanofibers.

Another aspect of the present invention provides a method for preparing a supported catalyst, including a) mixing core particles with shell particles to prepare a core-shell structured support in which the shell particles are coated on the core particles, b) preparing a metal catalyst precursor solution, c) mixing the metal catalyst precursor solution with the core-shell structured support to prepare a supported catalyst precursor in which the metal catalyst precursor is supported on the support, and d) calcining the supported catalyst precursor.

In the present invention, in step d), the supported catalyst precursor may be calcined at 400 to 800° C.

In the present invention, the method may further include calcining the core-shell structured support before mixing of the metal catalyst precursor solution with the core-shell structured support in step c).

In the present invention, a dispersant, an adhesive, or a mixture thereof may be mixed with the core particles and the shell particles in step a).

Another aspect of the present invention provides a method for producing carbon nanostructures, including supplying a mixed gas of an inert gas, a carbon source gas and a reducing gas to the supported catalyst to allow the mixed gas to react with the supported catalyst.

In the present invention, the mixed gas may be supplied at a flow rate of 60 to 270 sccm and may be allowed to react with the supported catalyst at 500 to 800° C.

In the present invention, the mixed gas may be allowed to react with the supported catalyst for 30 minutes to 5 hours.

Yet another aspect of the present invention provides a carbon nanostructure aggregate including a supported catalyst and carbon nanostructures grown on the supported catalyst wherein each of the carbon nanostructures includes a first end in contact with the supported catalyst and a second end positioned opposite the first end and growing in the lengthwise direction, and wherein at least a part of the carbon nanostructures form a secondary structure in which the first ends are each independently supported on the supported catalyst and the second ends are assembled in contact with each other.

In the present invention, the supported catalyst may be the supported catalyst according to the one aspect of the present invention.

In the present invention, the carbon nanostructures may have a strand diameter of at least 0.5 μm and a length of at least 200 μm.

In the present invention, the carbon nanostructure aggregate may have an average particle diameter of 50 to 1000 μm.

The supported catalyst of the present invention has a structure in which a metal catalyst is supported on a core-shell structured support, which includes core particles and shell particles having a smaller particle diameter than the core particles and coated on the core particles to form a shell layer. Due to this structure, the supported catalyst can be used to produce carbon nanostructures that form a novel secondary structure in which ends of the carbon nanostructures are supported on the supported catalyst and form independent branches and the opposite ends grow and are assembled together. The novel structure is expected to find application in various fields, such as energy materials, functional composites, pharmaceuticals, batteries, and semiconductors, because of its characteristic shape.

DETAILED DESCRIPTION OF THE INVENTION

The present invention will now be described in more detail.

The present invention is directed to a supported catalyst having a novel structure and carbon nanostructures with a novel secondary structure produced using the supported catalyst.

The supported catalyst of the present invention has a structure in which a metal catalyst is supported on a core-shell structured support, which includes core particles and shell particles having a smaller particle diameter than the core particles and coated on the core particles to form a shell layer. Specifically, the supported catalyst of the present invention includes a core-shell structured support and a metal catalyst supported on the support. The supported catalyst of the present invention is prepared by impregnating a solution of a metal catalyst precursor into a core-shell structured support, which is obtained by coating fine support particles on substantially spherical core support particles to form a thin shell layer.

Impregnation methods for preparing catalysts are classified into adsorption, evaporation drying, spray, and incipient wetness impregnation methods depending on how to contact active materials. According to the adsorption method, a catalyst is prepared by dipping a support in a solution of an active material to adsorb the active material to the support surface. The catalyst has a structure in which the active material is supported on the support. According to the evaporation drying method, a catalyst is prepared by dipping a support in a solution of an active material and vaporizing the solvent to attach the active material to the support. This method has a disadvantage in that when a large amount of the active material is supported on the support and many fine pores are formed in the support, the pores may be clogged. According to the spray method, a catalyst is prepared by placing a support in an evaporator and spraying a solution of an active material on the support with shaking to support the active material on the support. However, a larger amount of the active material is attached to the outer surface of the support rather than to the pores of the support. The incipient wetness impregnation method is the most widely used method. According to the incipient wetness impregnation method, a catalyst is prepared by adsorbing a solution of an active material in a solvent to a dried support, followed by drying to remove the solvent. The active material is used in an amount corresponding to the pore volume of the support. This method is advantageously simple to carry out. The evaporation drying or incipient wetness impregnation method may be used to prepare the supported catalyst of the present invention. In this case, the metal catalyst supported as an active material can be uniformly distributed on the support.

In the present invention, the ratio of the diameter ($d_{50}$) of the core particles to the diameter ($d_{50}$) of the shell particles may be 1:0.0001-0.1, 1:0.0001-0.01, or 1:0.001-0.01.

The diameter ($d_{50}$) of the particles is defined as the particle diameter whose integrated value is 50% in a number particle diameter distribution curve obtained in the particle diameter range of 0.01 to 2000 µm using a laser diffraction particle size analyzer (Microtrac, Bluewave) after 40% by weight of the particles are dispersed in water at a temperature of 25° C. and a humidity of 70%, followed by sonication (40 watt, 3 min).

In the present invention, the diameter ($d_{50}$) of the core particles may be from 1 to 100 µm, from 10 to 90 µm, from 20 to 80 µm, or from 30 to 70 µm.

In the present invention, the diameter ($d_{50}$) of the shell particles may be from 0.01 to 0.9 µm, from 0.05 to 0.9 µm, from 0.05 to 0.8 µm, from 0.1 to 0.7 µm, or from 0.1 to 0.5 µm.

In the present invention, the core particles and the shell particles may be each independently made of at least one material selected from the group consisting of AlO(OH), Al(OH)$_3$, gamma-Al$_2$O$_3$, and alpha-Al$_2$O$_3$. The core particles/shell particles are preferably AlO(OH)/gamma-Al$_2$O$_3$, AlO(OH)/AlO(OH), gamma-Al$_2$O$_3$/gamma-Al$_2$O$_3$, gamma-Al$_2$O$_3$/AlO(OH), or a combination thereof. More preferably, the core particles/shell particles are gamma-Al$_2$O$_3$/AlO(OH).

AlO(OH) (boehmite) may be produced in various forms according to its production method and may be large in specific surface area and pore volume. Al(OH)$_3$ may also be used as a material for a porous support. Al$_2$O$_3$ (alumina) is structurally stable, and its pore size and distribution are variable over wide ranges. Al$_2$O$_3$ (alumina) participates in catalytic reactions due to the presence of weak acid sites and meets the requirements of supports in terms of physical and mechanical properties due to its better ability to disperse metals than silica supports. Al$_2$O$_3$ is classified into low-temperature transition aluminas such as κ, X, ρ, η, Y, and δ aluminas and high-temperature transition aluminas such as θ, α, and β aluminas. The purity of alumina is greatly affected by raw materials and production methods thereof. Particularly, gamma-Al$_2$O$_3$ and alpha-Al$_2$O$_3$ may be used in the present invention.

In the present invention, the support may include 1 to 50% by weight, preferably 5 to 40% by weight, more preferably 10 to 30% by weight, of the shell particles, based on the weight of the core particles. Within this range, the amount of the carbon nanostructure bundles with a novel secondary structure according to the present invention increases with increasing content of the shell particles. If the amount of the shell particles coated exceeds the range defined above, the density of the carbon nanostructures increases excessively, making it difficult to maintain the well-defined shape of the carbon nanostructures.

In the present invention, the secondary structure has a structure in which each of the carbon nanostructures includes a first end in contact with the supported catalyst and a second end positioned opposite the first end and growing in the lengthwise direction, the first ends are each independently supported on the supported catalyst, and the second ends are assembled in contact with each other. The secondary structure has a characteristic shape in which many branches of the carbon nanostructures in contact with the support are assembled together at the opposite ends. The shape of the secondary structure resembles the tentacles of an octopus and is sometimes called an "octopus-like shape" by the present inventors.

In the present invention, the metal catalyst may be selected from the group consisting of Co, Fe, Mo, V, and mixtures thereof. Preferably, the metal catalyst includes a main catalyst selected from Co, Fe, and mixtures thereof and an auxiliary catalyst selected from Mo, V, and mixtures thereof. More preferably, the metal catalyst may be a combination of Co and Mo or a combination of Co and V.

The use of Co as the main catalyst of the metal catalyst increases the density, yield, and size of the carbon nanostructures and well defines the novel shape of the carbon nanostructure bundles.

When molybdenum (Mo) is used as the auxiliary catalyst, a carbon nanostructure aggregate including the secondary structure with the above-described shape can be well defined and its size can be increased. Alternatively, vanadium (V) may be used as the auxiliary catalyst. In this case, the yield and density of a carbon nanostructure aggregate including the secondary structure with the above-described shape may be advantageously increased.

Accordingly, the use of a Co-based catalyst is advantageous in the formation of a carbon nanostructure aggregate including the above-described secondary structure, and the use of molybdenum (Mo) and vanadium (V) as suitable auxiliary catalysts provides control over the shape/size and density/yield of the carbon nanostructure aggregate.

In the present invention, the molar ratio of the main catalyst to the auxiliary catalyst may be in the range of 20-:1 to 1:1. Within this range, the shape of the secondary structure of the carbon nanostructures is well defined and the yield of the carbon nanostructure aggregate is high. The main catalyst and the auxiliary catalyst is preferably in a molar ratio of 10-2:1, more preferably 7-3:1, most preferably 5:1. Within this range, the shape of the secondary structure is well defined.

In the present invention, the metal catalyst may include 1 to 40% by weight of the main catalyst, based on the total weight of the supported catalyst. The content of the main catalyst is preferably from 10 to 34% by weight, more preferably from 15 to 25% by weight. Within this range, an aggregate can be obtained in which the secondary structure having the novel shape according to the present invention is uniformly formed. The yield of the aggregate tends to increase with increasing content of the main catalyst.

In the present invention, the carbon nanostructures may be carbon nanotubes, carbon nanorods, carbon nanohairs, or carbon nanofibers, but are not limited thereto. For example, carbon nanotubes may be used as the carbon nanostructures.

The present invention also provides a method for preparing a supported catalyst, including a) mixing core particles with shell particles to prepare a core-shell structured support in which the shell particles are coated on the core particles, b) preparing a metal catalyst precursor solution, c) mixing the metal catalyst precursor solution with the core-shell structured support to prepare a supported catalyst precursor in which the metal catalyst precursor is supported on the support, and d) calcining the supported catalyst precursor.

In the present invention, in step a), the shell particles may be coated on the core particles by a general coating technique using a sol coating solution. The coating procedure may be repeated several times to form a uniform shell layer with high density. The frequency of coating may be suitably determined depending on the desired support. The coating procedure is preferably repeated 1 to 10 times.

In step c), the metal catalyst precursor solution may be mixed with the core-shell structured support by any suitable technique for supporting a metal catalyst on a support. The core-shell structured support may be impregnated with the metal catalyst precursor solution. The impregnation may be performed either batchwise or continuously.

In the present invention, in step d), the supported catalyst precursor may be calcined at 400 to 800° C., preferably 500 to 700° C., more preferably 550 to 650° C. Outside this range, the secondary structure having the novel shape according to the present invention is not easily obtained and the overall yield may be considerably reduced.

The metal catalyst precursor may be a water soluble salt commonly used in the art. Examples of such water soluble salts include metal nitrates, metal nitrides, metal hydroxides, metal oxides, metal oxalates, metal acetates (OAc), metal amines, metal chlorides, other metal halides, metal carbonyl complexes, and metal hydrates.

Examples of suitable metal catalyst precursors include, but are not limited to: cobalt precursors, such as $Co(NO_3)_2 \cdot 6H_2O$ (cobalt (II) nitrate hexahydrate), $Co_2(CO)_6$ (dicobalt octacarbonyl), $[Co_2(CO)_6(t\text{-}BuC\!=\!CH)]$ (dicobalt hexacarbonyl t-butylacetylene), and $Co(OAc)_2$ (cobalt acetate); iron precursors, such as $Fe(NO_3)_3 \cdot 9H_2O$ (iron (III) nitrate nonahydrate) and $Fe(OAc)_2$ (iron acetate); molybdenum precursors, such as $Mo(CO)_6$ (molybdenum hexacarbonyl), $(NH_4)_6Mo_7O_{24} \cdot 4H_2O$ (ammonium paramolybdate), and $(NH_4)MoS_4$ (ammonium tetrathiomolybdate); and vanadium precursors, such as $NH_4VO_3$ (ammonium metavanadate).

The method of the present invention may further include calcining the core-shell structured support before mixing of the metal catalyst precursor solution with the core-shell structured support in step c). The calcination may be repeated several times. The frequency of calcination may be suitably determined depending on the desired support. The calcination is preferably repeated 1 to 10 times. The calcination enables the formation of large and well-defined sites where the second ends of the carbon nanostructures in a carbon nanostructure aggregate including the secondary structure of the present invention are assembled in contact with each other. Particularly, as the calcination temperature increases, sites where the second ends of the carbon nanostructures are assembled in contact with each other are large in size and appear well defined.

In the present invention, a dispersant, an adhesive, or a mixture thereof may be mixed with the core particles and the shell particles in step a). The dispersant may be helpful in dispersing the particles to make the degree of coating of the shell particles on the core particles uniform. For example, $HNO_3$ may be used as the dispersant. The adhesive may be added to assist in attaching the coating materials to the cores. For example, a polymeric material such as polyacrylic acid (PAA) may be used as the adhesive.

The present invention also provides a method for producing carbon nanostructures, including supplying a mixed gas of an inert gas, a carbon source gas and a reducing gas to the supported catalyst to allow the mixed gas to react with the supported catalyst.

In the present invention, the mixed gas may be supplied at a flow rate of 60 to 270 sccm and may be allowed to react with the supported catalyst at 500 to 800° C. Preferably, the mixed gas of the inert gas, the carbon source gas, and the reducing gas in a ratio of 1:1:1 is supplied at a flow rate of 120 to 240 sccm. The mixed gas may be allowed to react with the supported catalyst at 600 to 750° C. or 650 to 700° C. Within this range, the formation of a carbon nanostructure aggregate including the secondary structure with the novel structure according to the present invention may be further promoted.

In the present invention, the mixed gas may be allowed to react with the supported catalyst for 30 minutes to 5 hours. When the mixed gas reacts with the supported catalyst for a longer time, the secondary structure of the carbon nanostructures with the novel structure according to the present invention may be formed in higher density and the individual carbon nanostructures may be larger in length.

The present invention also provides a carbon nanostructure aggregate including a supported catalyst and carbon nanostructures grown on the supported catalyst wherein each of the carbon nanostructures includes a first end in contact with the supported catalyst and a second end positioned opposite the first end and growing in the lengthwise direction, and wherein at least a part of the carbon nanostructures form a secondary structure in which the first ends are each independently supported on the supported catalyst and the second ends are assembled in contact with each other.

In the present invention, the supported catalyst may be the core-shell structured supported catalyst, which has been described above. The use of the core-shell structured supported catalyst for carbon nanostructure production according to the present invention enables the production of the carbon nanostructure aggregate including the secondary structure with the above-described shape.

In the present invention, the carbon nanostructures may have a strand diameter of at least 0.5 μm and a length of at least 200 μm.

In the present invention, the carbon nanostructure aggregate may have an average particle diameter of 50 to 1,000 μm.

The average particle diameter of the aggregate may be determined by taking a SEM image of the aggregate and measuring the length of the aggregate on the image by statistical analysis using MATLAB Image Processing Toolbox.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

<Example 1> Synthesis of Secondary Structure of CNTs Using Core-Shell Structured Supported Catalyst <Example 1-1> Preparation of Core-Shell Structured Supported Catalyst A sol coating solution including 10 wt % of milled AlO(OH) with 0.320 μm diameter ($d_{50}$) was added to 1.0 g of spherical gamma-$Al_2O_3$ with 50 μm diameter ($d_{50}$) to prepare a core-shell structured support in which the AlO(OH) was coated on the gamma-$Al_2O_3$ cores.

$Co(NO_3)_2 \cdot 6H_2O$ as a Co precursor and $(NH_4)_6Mo_7O_{24} \cdot 4H_2O$ as a Mo precursor were completely dissolved in 50 mL of distilled water. The precursors were used in such amounts that the molar ratio of Co:Mo was 5:1 and the content of Co was 20 wt %. 1.0 g of the core-shell structured support was mixed with the solution at 60° C. and 85 mb for 30 min and at 10 mb for 30 min to obtain a supported catalyst precursor in the form of a solid. The supported catalyst precursor was dried at 120° C. for 1 h, pulverized, and calcined at 600° C. for 4 h, affording 1.12 g of a supported catalyst.

<Example 1-2> Synthesis of Secondary Structure of CNTs 2 mg of the supported catalyst was mounted at the center of a quartz tube having an inner diameter of 55 mm in a horizontal fixed bed CVD system and heated to 675° C. under a nitrogen atmosphere. Thereafter, a mixed gas of nitrogen ($N_2$), hydrogen ($H_2$) and ethylene ($C_2H_4$) gases in a volume ratio of 1:1:1 was allowed to flow for 1 h while maintaining the same temperature, affording a secondary structure of CNTs. After completion of the reaction, the secondary structure was allowed to cool to room temperature under a nitrogen atmosphere.

Figure 1:
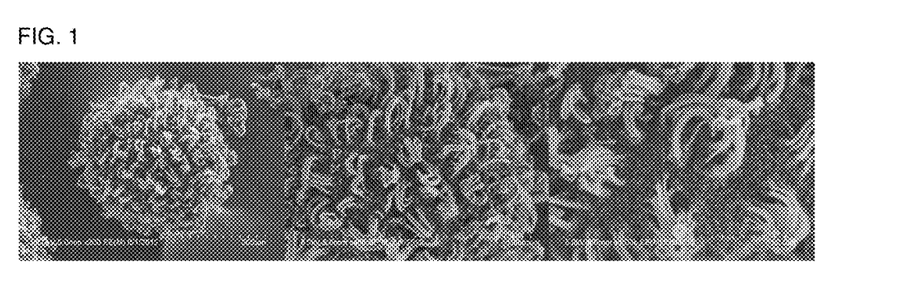
FIG. 1 shows SEM images of a CNT bundle produced in Example 1.

FIG. 1 shows SEM images of the secondary structure of CNTs. As shown in FIG. 1, the secondary structure consisted of a number of CNTs, each of which included a first end in contact with the supported catalyst and a second end growing in the lengthwise direction. The first ends were each independently supported on the supported catalyst and the second ends were assembled in contact with each other.

<Comparative Example 1> Synthesis of Secondary Structure of CNTs Using Supported Catalyst Having Structure Other than Core-Shell Structure <Comparative Example 1-1> Preparation of Supported Catalyst Using $Al_2O_3$ 870 mg of $Co(NO_3)_2 \cdot 6H_2O$ as a Co precursor and 120 mg of $(NH_4)_6Mo_7O_{24} \cdot 4H_2O$ as a Mo precursor were completely dissolved in 50 mL of distilled water. 1.0 g of gamma-$Al_2O_3$ with 50 μm diameter ($d_{50}$) was mixed with the solution at 60° C. and 85 mb for 30 min and at 10 mb for 30 min to obtain a supported catalyst precursor in the form of a solid. The supported catalyst precursor was dried at 120° C. for 1 h, pulverized, and calcined at 600° C. for 4 h, affording 1.12 g of a supported catalyst.

<Comparative Example 1-2> Synthesis of Secondary Structure of CNTs 2 mg of the supported catalyst was mounted at the center of a quartz tube having an inner diameter of 55 mm in a horizontal fixed bed CVD system and heated to 675° C. under a nitrogen atmosphere. A mixed gas of nitrogen ($N_2$), hydrogen ($H_2$) and ethylene ($C_2H_4$) gases in a volume ratio of 1:1:1 was allowed to flow for 1 h while maintaining the same temperature, affording a CNT aggregate. After completion of the reaction, the CNT aggregate was allowed to cool to room temperature under a nitrogen atmosphere.

Figure 2:
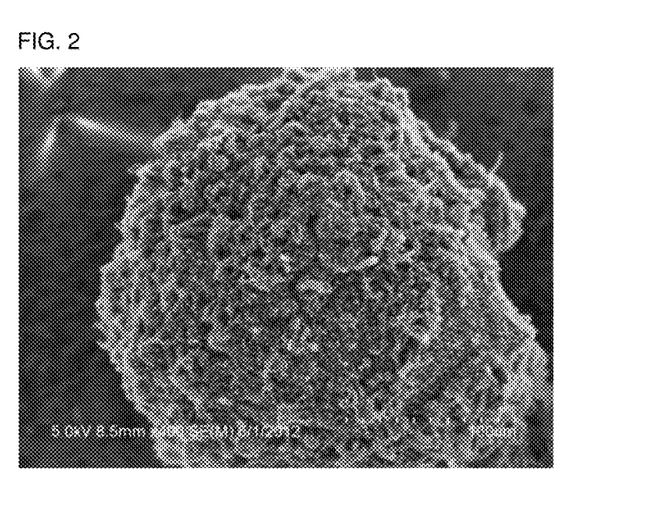
FIG. 2 shows a SEM image of a CNT aggregate produced in Comparative Example 1.

FIG. 2 shows a SEM image of the CNT aggregate. As shown in FIG. 2, the CNT aggregate consisted of a number of CNTs and the individual CNTs were grown randomly. This random growth impeded the formation of a secondary structure with a defined shape.

Figure 3:
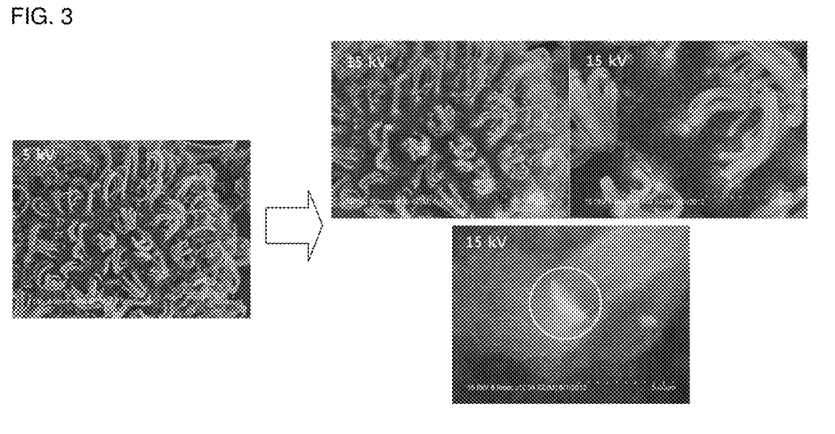
FIG. 3 shows SEM images of a CNT bundle produced in Example 1.

<Experimental Example 1> Confirmation of Shape of the Secondary Structure of CNTs and the Metal Catalyst The secondary structure of CNTs synthesized in Example 1 was observed using FE-SEM (HITACHI S-4800, Cold cathode field emission gun, 3-stage electromagnetic lens system, SE detector) at acceleration voltages of 5 kV and 15 kV, an emission current of 10 µA, and a working distance of 8 mm, and the SEM images are shown in FIG. 3.

The image obtained at 5 kV clearly shows that the secondary structure consisted of a number of CNTs including first ends, which were in contact with the supported catalyst and were each independently supported on the supported catalyst, and second ends, which grew in the lengthwise direction and were assembled in contact with each other.

The metal catalyst was confirmed from the images obtained at 15 kV. The images show that the secondary structure of CNTs had the same shape as described above and the metal catalyst particles with 3 µm size were present under the lower ends of the CNTs. That is, the metal catalyst was located a distance of about 5 µm from the gamma-$Al_2O_3$ (core) and remained unchanged in location, and the CNTs were grown thereon.

Figure 4:
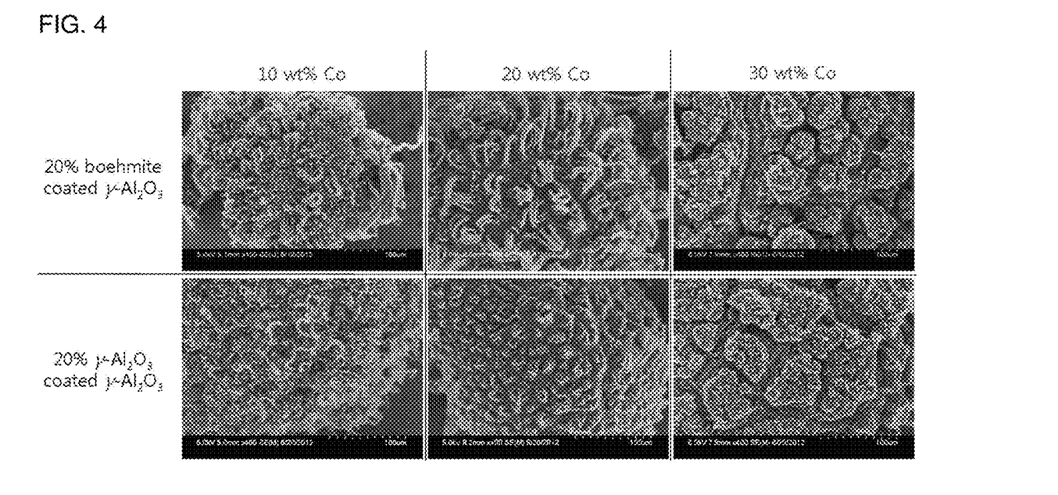
FIG. 4 shows SEM images of CNT bundles produced in Example 2 where different kinds of Al-based particles for shells were used.

<Example 2> Confirmation of Secondary Structures of CNTs Depending on the Kind of Al-Based Particles for Shells Secondary structures of CNTs were synthesized in the same manner as in Example 1, except that a core-shell structured support including gamma-$Al_2O_3$ cores with 50 µm diameter ($d_{50}$) and AlO(OH) with 0.320 µm diameter ($d_{50}$) coated on the cores was prepared and the Co content was adjusted to 10 wt %, 20 wt %, and 30 wt %. Secondary structures of CNTs were synthesized in the same manner as in Example 1, except that a core-shell structured support including gamma-$Al_2O_3$ cores with 50 µm diameter ($d_{50}$) and $Al_2O_3$ with 0.250 µm diameter ($d_{50}$) coated on the cores was prepared and the content of Co in the metal catalyst was adjusted to 10 wt %, 20 wt %, and 30 wt %. As can be seen from FIG. 4, the use of the supported catalyst prepared using the core-shell structured support in which gamma-$Al_2O_3$ was coated on the gamma-$Al_2O_3$ cores led to the formation of small amounts of the secondary structures of CNTs including first ends, which were in contact with the supported catalyst and were each independently supported on the supported catalyst, and second ends, which grew in the lengthwise direction and were assembled in contact with each other, irrespective of the Co content. When the core-shell structured support in which AlO(OH) was coated on the gamma-$Al_2O_3$ cores was used and the metal catalyst including 20 wt % of Co was supported on the support, the secondary structure of CNTs including first ends, which were in contact with the supported catalyst and were each independently supported on the supported catalyst, and second ends, which grew in the lengthwise direction and were assembled in contact with each other, was formed in a large amount, irrespective of the Co content.

Figure 5:
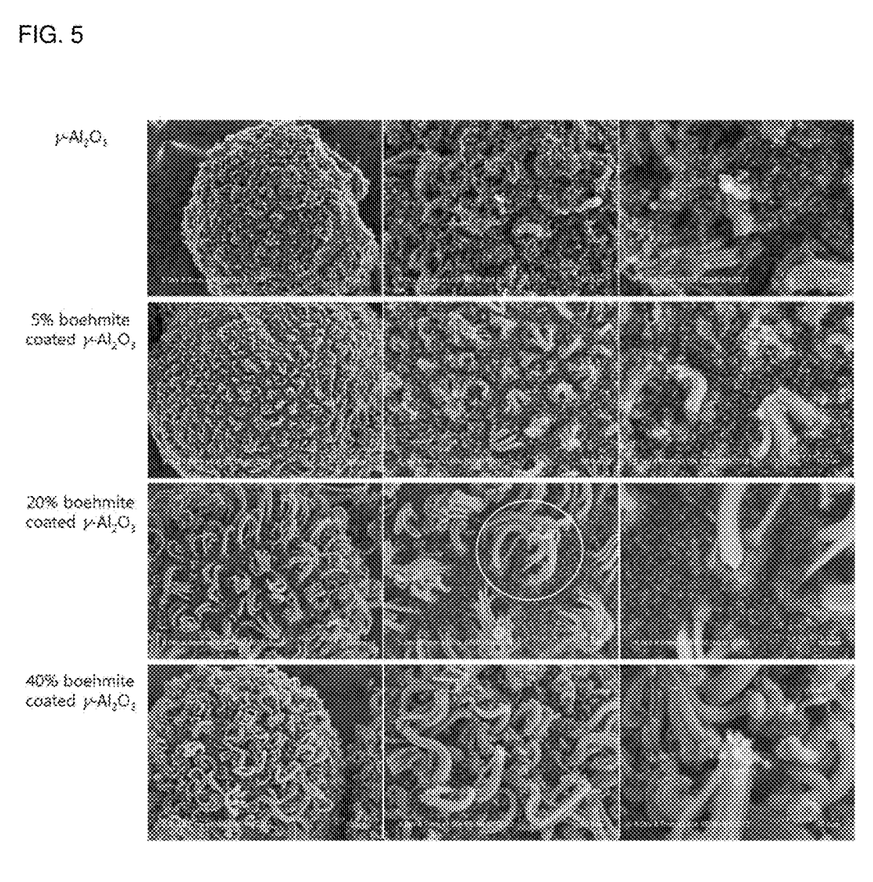
FIG. 5 shows SEM images of CNT bundles produced in Example 3 where Al-based particles for shells were used in different amounts.

<Example 3> Confirmation of Secondary Structures of CNTs Depending on the Content of Al-Based Particles for Shells Secondary structures of CNTs were synthesized in the same manner as in Example 1, except that the amount of AlO(OH) coated on gamma-$Al_2O_3$ was adjusted to 5 wt %, 20 wt %, and 40 wt %. Images of the secondary structures are shown in FIG. 5. The amounts of CNT aggregates including secondary structures of CNTs including first ends, which were in contact with the supported catalyst and were each independently supported on the supported catalyst, and second ends, which grew in the lengthwise direction and were assembled in contact with each other, tended to increase with increasing AlO(OH) content. However, when coated with 40 wt % of AlO(OH), the CNT density increased excessively, leading to the formation of a small amount of the secondary structure with an ill-defined shape.

<Example 4> Confirmation of Secondary Structures of CNTs after Calcination of the Core-Shell Structured Support Secondary structures of CNTs were synthesized for 1 h and 3 h in the same manner as in Example 1, except that calcination was not performed on the core-shell structured support in which AlO(OH) was coated on the gamma-$Al_2O_3$ cores before mixing of the metal catalyst precursors with the support. Secondary structures of CNTs were synthesized for 1 h and 3 h in the same manner as in Example 1, except that the core-shell structured support was calcined at 300° C. and 600° C. before mixing of the metal catalyst precursors with the support. Images of the secondary structures are shown in FIGS. 6a and 6b.

Figure 6A:
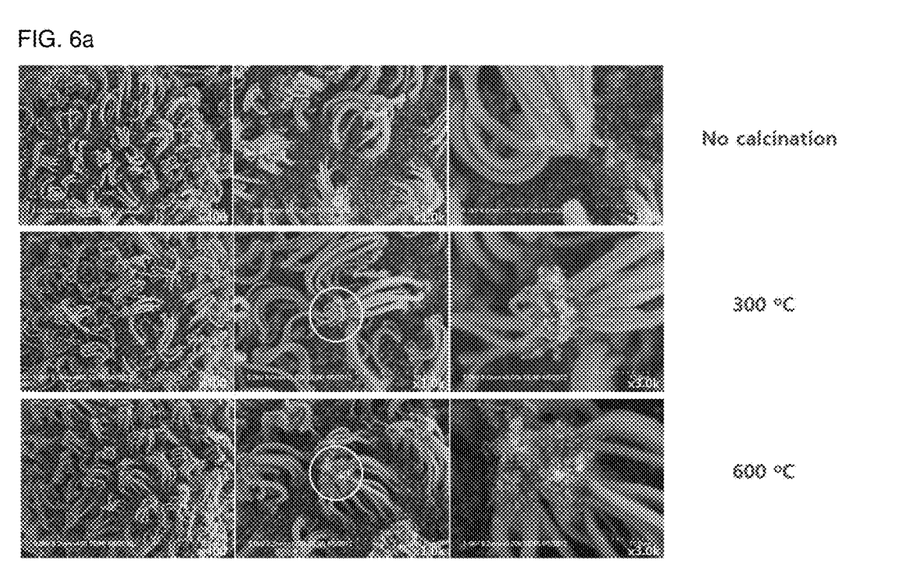
FIGS. 6a and 6b are SEM images of CNT bundles produced using a core-shell structured support having undergone no calcination and CNT bundles produced using a core-shell structured support having undergone calcination at different temperatures in Example 4.
Figure 6B:
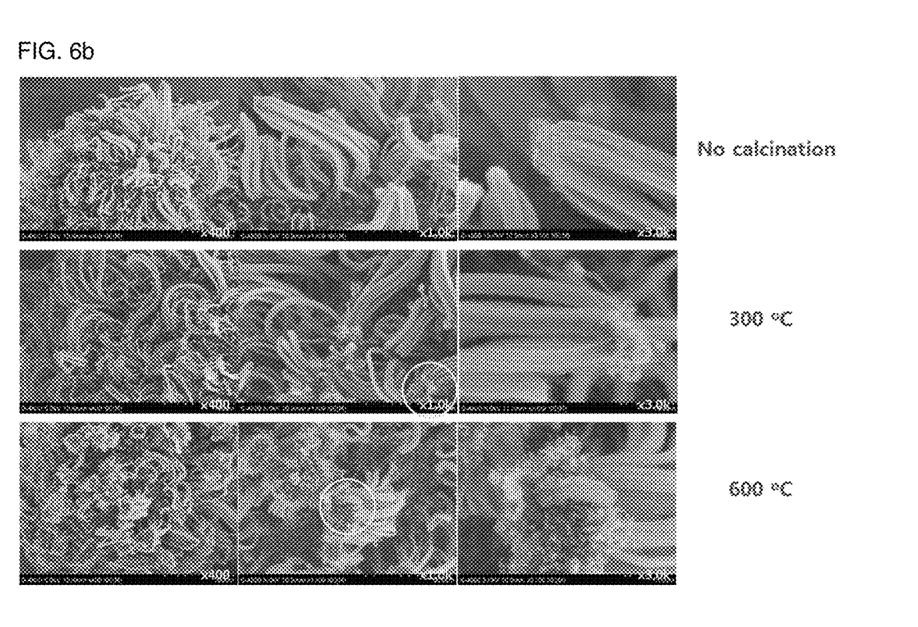

Referring to FIGS. 6a and 6b, each of the secondary structures formed a CNT aggregate in which the CNTs included first ends in contact with the supported catalyst and each independently supported on the supported catalyst and second ends growing in the lengthwise direction and assembled in contact with each other, irrespective of whether or not the support had undergone calcination. However, the CNT aggregates produced using the support having undergone no calcination were observed to have ill-defined sites where the second ends of the carbon nanostructures were assembled in contact with each other. In contrast, the CNT aggregates produced using the support having undergone calcination were observed to have large and well-defined sites where the second ends of the carbon nanostructures were assembled in contact with each other. The CNT aggregates produced using the support having undergone calcination at 600° C. were observed to have large and well-defined sites where the second ends of the carbon nanostructures were assembled in contact with each other, compared to the CNT aggregates produced using the support having undergone calcination at 300° C.

Figure 7A:
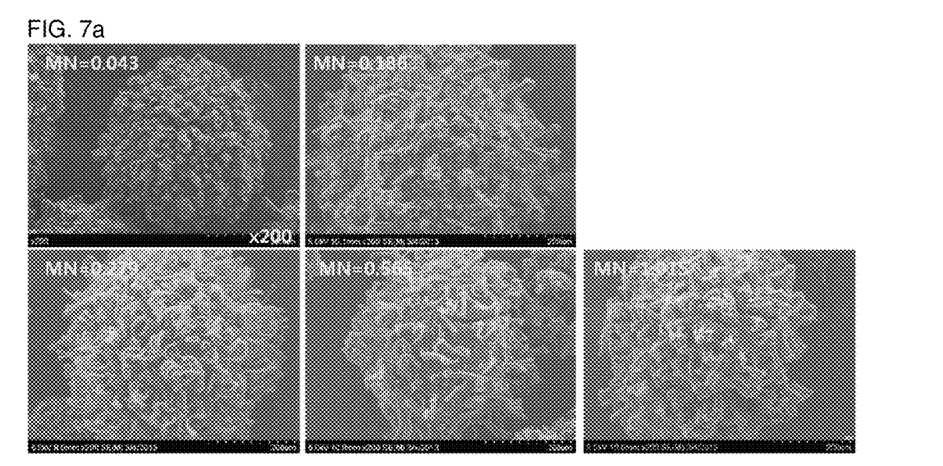
FIG. 7a shows SEM images of CNT bundles produced in Example 5 where Al-based particles for shells having different sizes were used.
Figure 7B:
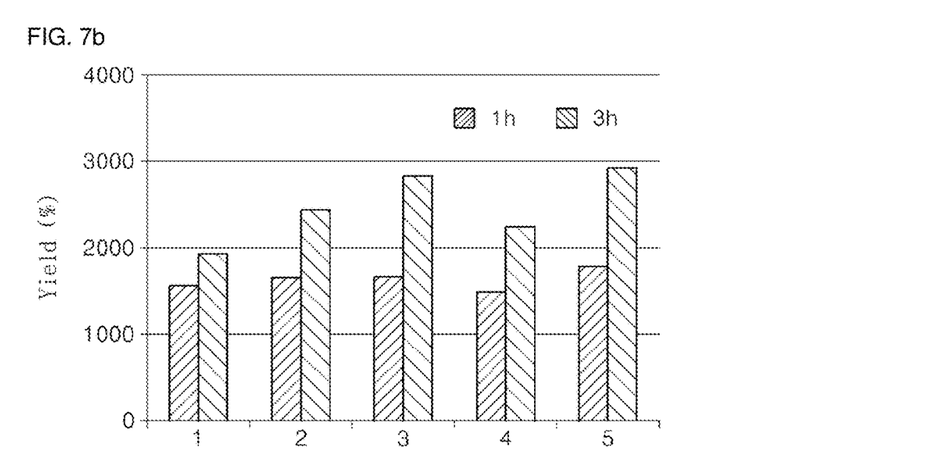
FIG. 7b is a graph showing the yields of the CNT bundles.

<Example 5> Confirmation of Secondary Structures of CNTs Depending on the Size of Al-Based Particles for Shells Secondary structures of CNTs were synthesized in the same manner as in Example 1, except that the size of the Al-based particles constituting shells was changed. Referring to FIGS. 7a and 7b and Table 1, as the average particle diameter of the Al-based particles increased, the distribution density of the octopus-like CNT structures tended to decrease and the head portions of the CNT structures tended to increase in size and be well defined. However, the reaction yields were found to be between 1500 and 3000%, irrespective of the size of the Al-based particles for shells.

The reaction yield was calculated by Equation 1:

Reaction yield (%)=[(Total weight after reaction−weight of catalyst used)/weight of catalyst used]×100    (1)

TABLE 1

|    | 1     | 2     | 3     | 4     | 5     |
|----|-------|-------|-------|-------|-------|
| MV | 0.358 | 1.465 | 2.864 | 3.46  | 6.73  |
| MN | 0.043 | 0.186 | 0.279 | 0.565 | 1.015 |
| MA | 0.105 | 0.562 | 1.332 | 1.824 | 3.23  |

Figure 8:
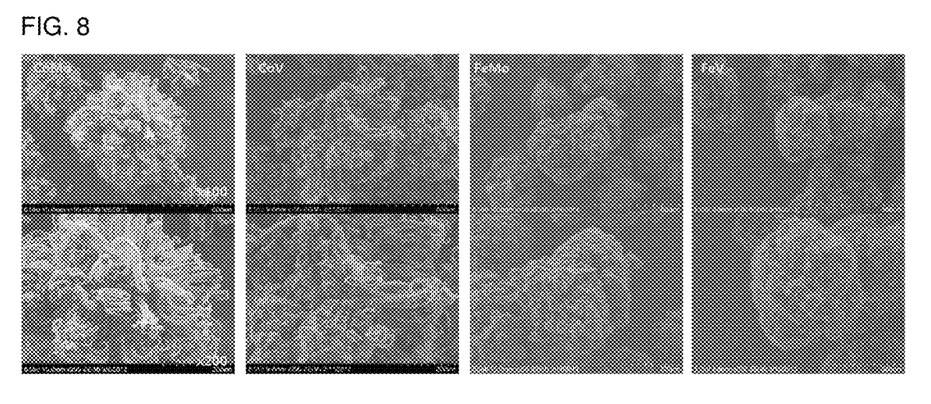
FIG. 8 shows SEM images of CNT bundles produced in Example 6 where different compositions of a metal catalyst were used.

MV: Volume average particle diameter,
MN: Number average particle diameter,
MA: Area average particle diameter <Example 6> Confirmation of Secondary Structures of CNTs Depending on the Composition of Main Catalyst-Auxiliary Catalyst of Metal Catalyst Secondary structures of CNTs were synthesized in the same manner as in Example 1, except that Co—Mo, Co—V, Fe—Mo, and F—V were used as main catalyst-auxiliary catalyst combinations (each molar ratio=5:1) of a metal catalyst and a mixed gas of nitrogen ($N_2$), hydrogen ($H_2$) and ethylene ($C_2H_4$) gases in a volume ratio of 1:1:1 was allowed to flow for 3 h. Referring to FIG. 8 and Table 2, when Co—Mo was used as a main catalyst-auxiliary catalyst combination, each of the secondary structures formed a CNT aggregate in which the CNTs included first ends in contact with the supported catalyst and each independently supported on the supported catalyst and second ends growing in the lengthwise direction and assembled in contact with each other. When Co—V was used as a main catalyst-auxiliary catalyst combination, a very high yield of 4000% or more was obtained and a CNT aggregate having the above-described shape was formed. Meanwhile, a small amount of a CNT aggregate was formed even when Fe was used as a main catalyst.

TABLE 2

| Main catalyst-auxiliary catalyst | Yield (%) |
|---|---|
| Co—Mo | 2100 |
| Co—V  | 4350 |
| Fe—Mo | 1208 |
| Fe—V  | 2440 |

Figure 9:
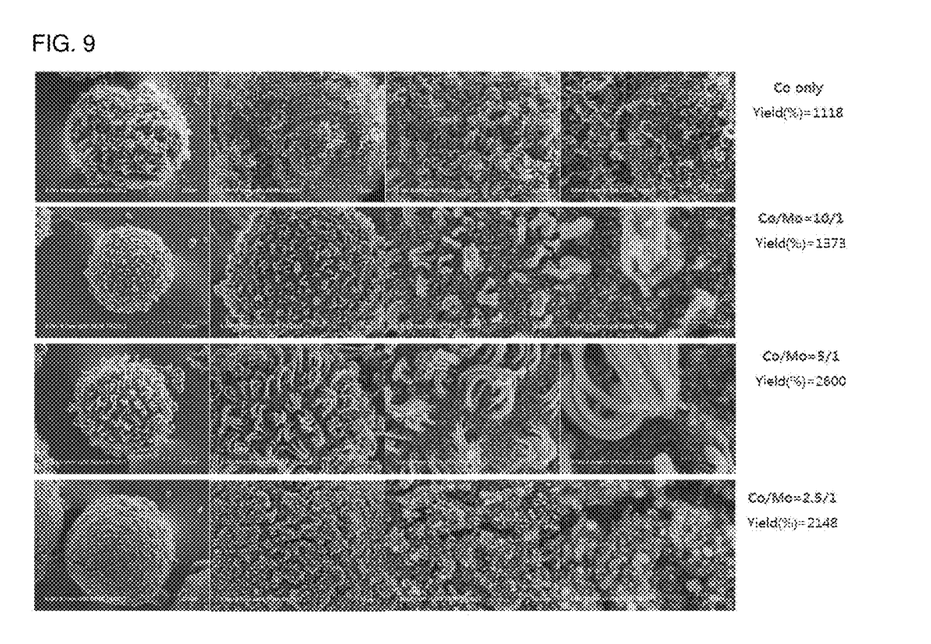
FIG. 9 shows SEM images of CNT bundles produced in Example 7 where a main catalyst and an auxiliary catalyst of a metal catalyst were used in different molar ratios.

<Example 7> Confirmation of Secondary Structures of CNTs Depending on the Molar Ratio of Main Catalyst and Auxiliary Catalyst of Metal Catalyst The procedure of Example 1 was repeated except that Co only was used as the main catalyst (i.e. the molar ratio of main catalyst:auxiliary catalyst=1:0). Secondary structures of CNTs were synthesized in the same manner as in Example 1, except that the molar ratio of the main catalyst (Co) to the auxiliary catalyst (Mo) was changed to 10:1, 5:1, and 2.5:1.

Referring to FIG. 9, when Co only was used as the metal catalyst, the CNTs did not form an outwardly protruding secondary structure and the individual strands were grown irregularly. When the molar ratio of the main catalyst to the auxiliary catalyst was 2.5:1, the secondary structure formed a small amount of an CNT aggregate in which the CNTs included first ends in contact with the supported catalyst and each independently supported on the supported catalyst and second ends growing in the lengthwise direction and assembled in contact with each other. In contrast, the use of the main catalyst and the auxiliary catalyst in a molar ratio of 5:1 led to the formation of a large amount of the secondary structure having the above-described shape. The secondary structure of CNTs produced using the main catalyst and the auxiliary catalyst in a molar ratio of 10:1 had the above-described shape but was slightly smaller and less dense than the secondary structure of CNTs produced using the main catalyst and the auxiliary catalyst in a molar ratio of 5:1.

Figure 10A:
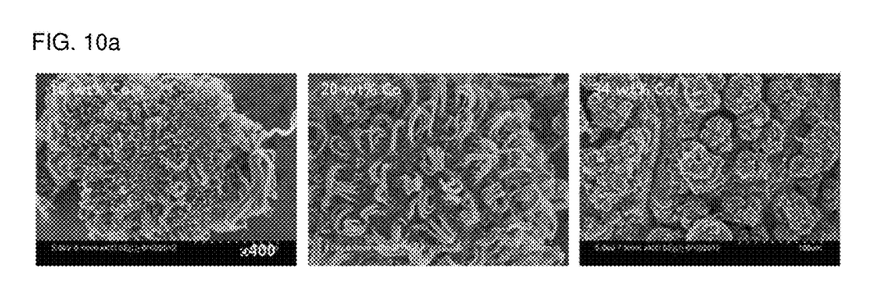
FIG. 10a and FIG. 10b show SEM images of CNT bundles produced in Example 8 where a main catalyst was used in different amounts.

<Example 8> Confirmation of Secondary Structures of CNTs Depending on the Content of Main Catalyst in Metal Catalyst Secondary structures of CNTs were synthesized in the same manner as in Example 1, except that the content of Co was changed to 10 wt %, 20 wt %, and 34 wt % while maintaining the molar ratio of Co:Mo at 5:1. Referring to FIG. 10a, when the Co content was 10 wt %, the secondary structure formed a CNT aggregate in which the CNTs included first ends in contact with the supported catalyst and each independently supported on the supported catalyst and second ends growing in the lengthwise direction and assembled in contact with each other. However, the CNT aggregate was not uniform in shape and was low in density. When the Co content was 20 wt %, the secondary structure of CNTs having the above-described shape was formed in a large amount. In contrast, when the Co content was 34 wt %, the secondary structure of CNTs having the above-described shape was formed in a small amount. Referring to the following table, the overall yield of the secondary structure increased with increasing Co content, irrespective of the shape of the secondary structure.

TABLE 3

| Co content (wt %) | Yield (%) |
|---|---|
| 10 | 331  |
| 20 | 1553 |
| 34 | 4073 |

Figure 10B:
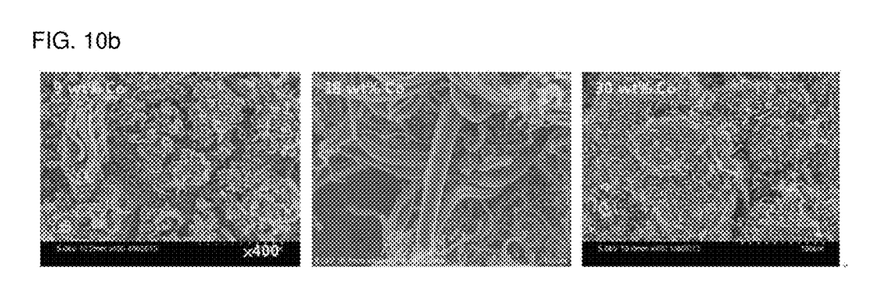

Secondary structures of CNTs were synthesized in the same manner as in Example 1, except that V was used as the auxiliary catalyst, the molar ratio of Co:V was adjusted to 7.5:1, the content of Co was changed to 9 wt %, 18 wt %, and 30 wt %, and a mixed gas of nitrogen ($N_2$), hydrogen ($H_2$) and ethylene ($C_2H_4$) gases in a volume ratio of 1:1:1 was allowed to flow for 3 h. As can be seen from FIG. 10b, when the Co content was 9 wt %, the secondary structure formed a CNT aggregate in which the CNTs included first ends in contact with the supported catalyst and each independently supported on the supported catalyst and second ends growing in the lengthwise direction and assembled in contact with each other. However, the CNT aggregate was not uniform in shape and was low in density. In contrast, when the Co content was 18 wt %, the secondary structure of CNTs having the above-described shape was formed in a large amount and was ≥10 μm thick and ≥100 μm long. In contrast, when the Co content was 30 wt %, the secondary structure of CNTs having the above-described shape was formed in a small amount and was entangled with the CNTs having ≤3 μm thickness and 20-30 μm length. Meanwhile, the following table shows that the overall yield of the secondary structure increased with increasing Co content, irrespective of the shape of the secondary structure.

TABLE 4

| Co content (wt %) | Yield (%) |
|---|---|
| 9 | 886 |
| 18 | 2300 |
| 30 | 11653 |

Figure 11:
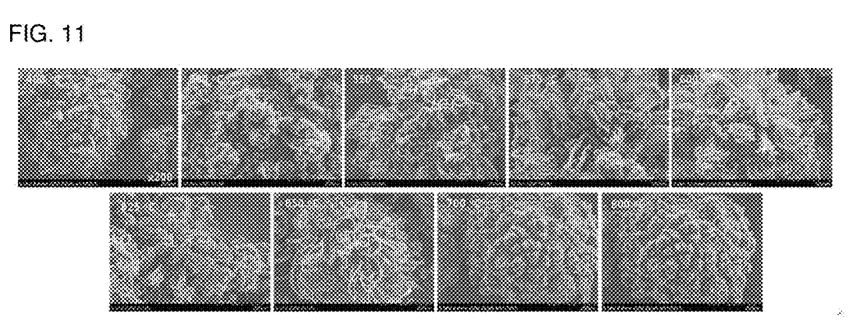
FIG. 11 shows SEM images of CNT bundles produced in Example 9 where a supported catalyst precursor was calcined at different temperatures.

<Example 9> Confirmation of Secondary Structures of CNTs Depending on Calcination Temperature for the Preparation of Supported Catalyst Secondary structures of CNTs were synthesized in the same manner as in Example 1, except that the supported catalyst precursor was calcined at different temperatures of 400° C., 500° C., 550° C., 575° C., 600° C., 625° C., 650° C., 700° C., and 800° C. Referring to FIG. 11, each of the secondary structures formed a large amount of a CNT aggregate in which the CNTs included first ends in contact with the supported catalyst and each independently supported on the supported catalyst and second ends growing in the lengthwise direction and assembled in contact with each other.

Figure 12:
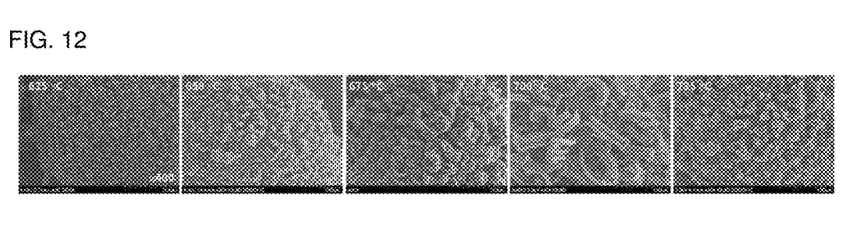
FIG. 12 shows SEM images of CNT bundles produced in Example 10 where a supported catalyst was reacted with a mixed gas at different temperatures.

<Example 10> Confirmation of Secondary Structures of CNTs Depending on Temperature for Reaction Between Supported Catalyst and Carbon Source Gas Secondary structures of CNTs were synthesized in the same manner as in Example 1, except that nitrogen ($N_2$), hydrogen ($H_2$) and ethylene ($C_2H_4$) gases were allowed to react with the supported catalyst at different temperatures of 625° C., 650° C., 675° C., 700° C., and 725° C. As can be seen from FIG. 12, the reaction temperatures of 650° C., 675° C., and 700° C. greatly promoted the production of CNT aggregates including the secondary structures in which the CNTs included first ends in contact with the supported catalyst and each independently supported on the supported catalyst and second ends growing in the lengthwise direction and assembled in contact with each other.

Figure 13:
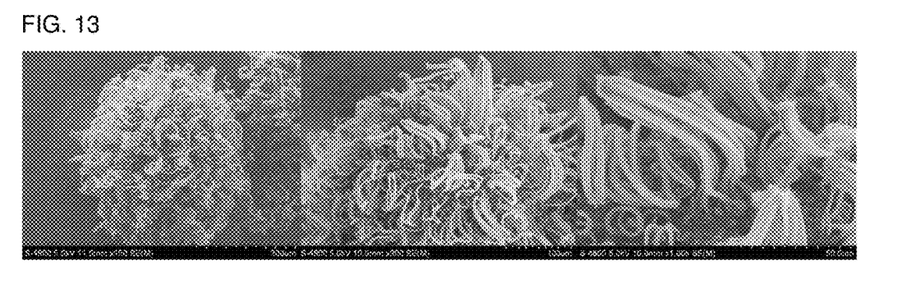
FIG. 13 shows SEM images of a CNT bundle produced in Example 11 where a supported catalyst was reacted with a mixed gas for 3 hours.

<Example 11> Confirmation of Secondary Structure of CNTs Depending on Time for Reaction Between Supported Catalyst and Carbon Source Gas A secondary structure of CNTs was synthesized in the same manner as in Example 1, except that that nitrogen ($N_2$), hydrogen ($H_2$) and ethylene ($C_2H_4$) gases were allowed to react with the supported catalyst for 3 h. Images of the secondary structure are shown in FIG. 13. The secondary structure formed a CNT aggregate in which the CNTs included first ends in contact with the supported catalyst and each independently supported on the supported catalyst and second ends growing in the lengthwise direction and assembled in contact with each other. The CNT strands of the CNT aggregate were grown longer and had a higher density than those of the CNT aggregate produced by reaction with the mixed gas for 1 h.

<Example 12> Confirmation of Secondary Structures of CNTs Depending on Addition of Dispersant and Adhesive The procedure of Example 1 was repeated except that 2 wt % of $HNO_3$ as a dispersant and 2 wt % of polyacrylic acid (PAA) as an adhesive were further added during coating to make the degree of coating of the Al-based particles on the cores uniform.

Figure 14:
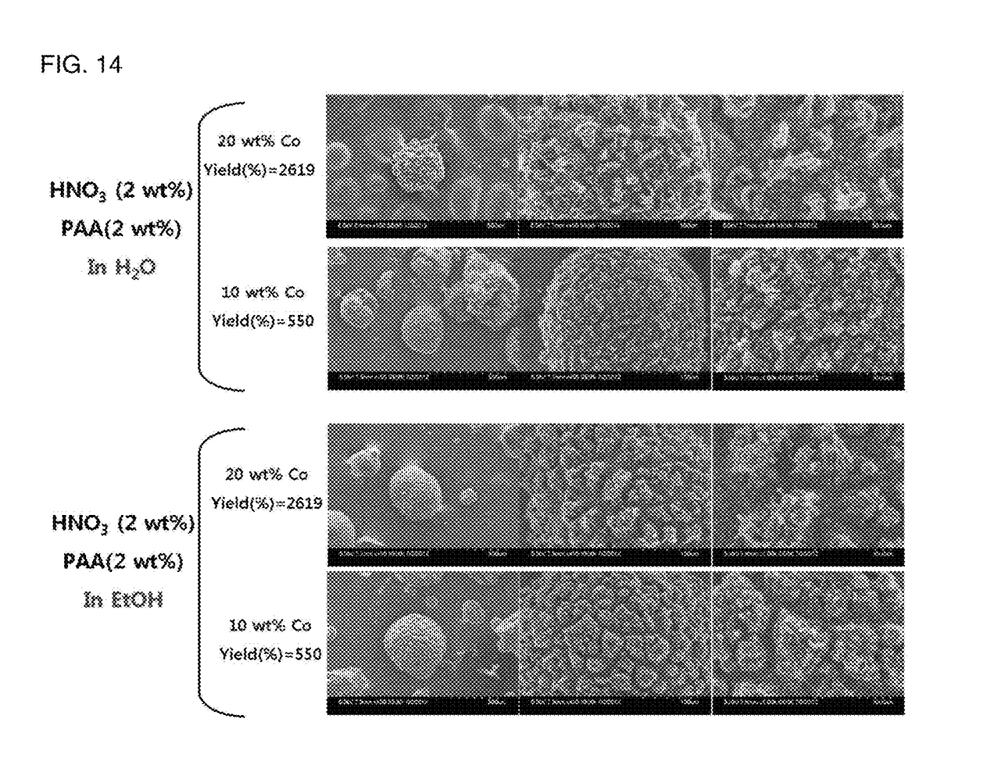
FIG. 14 shows SEM images of CNT bundles produced in Example 12 where a dispersant and an adhesive were added during coating.

FIG. 14 shows that the addition of the dispersant and the adhesive, together with water as a solvent, enabled the formation of CNT aggregates including secondary structures of CNTs with the above-described shape in which the CNTs included first ends in contact with the supported catalyst and each independently supported on the supported catalyst and second ends growing in the lengthwise direction and assembled in contact with each other, but the amounts of the CNT aggregates were smaller than those of the CNT aggregates produced without using the dispersant. When ethanol, which can be removed more rapidly than water, was used as a solvent, a smaller amount of time was required to attach the coating materials to the cores, and as a result, the coating materials could be prevented from getting entangled. In conclusion, higher yields of the CNT aggregates were obtained when ethanol was used as a solvent than when water was used as a solvent. When both the dispersant and the adhesive were used, the overall yields of the CNT aggregates were improved but the amounts of the secondary structures having the above-described shape were somewhat reduced.

As is apparent from the foregoing, the supported catalyst of the present invention has a structure in which a metal catalyst is supported on a core-shell structured support, which includes core particles and shell particles having a smaller particle diameter than the core particles and coated on the core particles to form a shell layer. Due to this structure, the supported catalyst can be used to produce carbon nanostructures that form a novel secondary structure in which ends of the carbon nanostructures are supported on the supported catalyst and form independent branches and the opposite ends grow and are assembled together. The novel structure is expected to find application in various fields, such as energy materials, functional composites, pharmaceuticals, batteries, and semiconductors, because of its characteristic shape.

What is claimed is:
1. A core-shell structured supported catalyst comprising:
a support; and
a metal catalyst supported on the support,
wherein the support comprises core particles and shell particles having a smaller particle diameter than the core particles,
wherein the shell particles form a shell layer which is formed on the core particles,
wherein the core particles and the shell particles are each made of at least one material selected from the group consisting of AlO(OH) and gamma-$Al_2O_3$,
wherein the ratio of the diameter ($d_{50}$) of the core particles to the diameter ($d_{50}$) of the shell particles is 1:0.0001-0.1, wherein the supported catalyst comprises a main catalyst selected from Co, Fe, and mixtures thereof, and the auxiliary catalyst is selected from Mo, V, and mixtures thereof, and wherein the supported catalyst comprises 15 to 25% by weight of the main catalyst based on the total weight of the supported catalyst.

2. The core-shell structured supported catalyst according to claim 1, wherein the diameter ($d_{50}$) of the core particles is from 1 to 100 μm.

3. The core-shell structured supported catalyst according to claim 1, wherein the diameter ($d_{50}$) of the shell particles is from 0.01 to 0.9 μm.

4. The core-shell structured supported catalyst according to claim 1, wherein the support comprises 1 to 50% by weight of the shell particles, based on the total weight of the support.

5. The core-shell structured supported catalyst according to claim 1, wherein the metal catalyst comprises the main catalyst and the auxiliary catalyst in a molar ratio of 20-1:1.

6. The core-shell structured supported catalyst according to claim 1, wherein the core particles are gamma-$Al_2O_3$ and the shell particles are AlO(OH).

7. The core-shell structured supported catalyst according to claim 1, wherein the supported catalyst is one for carbon nanostructure production.

8. The core-shell structured supported catalyst according to claim 7, wherein the carbon nanostructures are carbon nanotubes, carbon nanorods, carbon nanohairs, or carbon nanofibers.

9. A method for preparing the supported catalyst according to claim 1, comprising
 a) mixing core particles with shell particles to prepare a core-shell structured support in which the shell particles are coated on the core particles,
 b) preparing a metal catalyst precursor solution,
 c) mixing the metal catalyst precursor solution with the core-shell structured support to prepare a supported catalyst precursor in which the metal catalyst precursor is supported on the support, and
 d) calcining the supported catalyst precursor,
 wherein the core particles and the shell particles are made of gamma-$Al_2O_3$.

10. The method according to claim 9, wherein, in step d), the supported catalyst precursor is calcined at 400 to 800° C.

11. The method according to claim 9, further comprising calcining the core-shell structured support before mixing of the metal catalyst precursor solution with the core-shell structured support in step c).

12. The method according to claim 9, wherein a dispersant, an adhesive, or a mixture thereof is mixed with the core particles and the shell particles in step a).

13. A method for producing carbon nanostructures, comprising supplying a mixed gas of an inert gas, a carbon source gas and a reducing gas to the supported catalyst according to claim 1 to allow the mixed gas to react with the supported catalyst.

14. The method according to claim 13, wherein the mixed gas is supplied at a flow rate of 60 to 270 sccm and is allowed to react with the supported catalyst at 500 to 800° C.

15. The method according to claim 13, wherein the mixed gas is allowed to react with the supported catalyst for 30 minutes to 5 hours.

16. A carbon nanostructure aggregate comprising:
 the supported catalyst according to claim 1; and
 carbon nanostructures grown on the supported catalyst,
 wherein each of the carbon nanostructures comprises a first end in contact with the supported catalyst and a second end positioned opposite the first end and growing in the lengthwise direction, and
 wherein at least a part of the carbon nanostructures form a secondary structure in which the first ends are each independently supported on the supported catalyst and the second ends are assembled in contact with each other,
 wherein the core particles and the shell particles are made of gamma-$Al_2O_3$.

17. The carbon nanostructure aggregate according to claim 16, wherein the carbon nanostructures have a strand diameter of at least 0.5 μm and a length of at least 200 μm.

18. The carbon nanostructure aggregate according to claim 16, wherein the carbon nanostructure aggregate has an average particle diameter of 50 to 1000 μm.

* * * * *